US011532858B2

(12) United States Patent
Dorresteyn (10) Patent No.: US 11,532,858 B2
(45) Date of Patent: Dec. 20, 2022

(54) BUSBAR HOLDER FOR BATTERY

(71) Applicant: Damon Motors Inc., Vancouver (CA)

(72) Inventor: Derek Dorresteyn, Mill Valley, CA (US)

(73) Assignee: Damon Motors Inc., Vancouver (CA)

( * ) Notice: Subject to any disclaimer, the term of this patent is extended or adjusted under 35 U.S.C. 154(b) by 0 days.

(21) Appl. No.: 17/146,335

(22) Filed: Jan. 11, 2021

(65) Prior Publication Data

US 2021/0280950 A1 Sep. 9, 2021

Related U.S. Application Data

(60) Provisional application No. 62/985,282, filed on Mar. 4, 2020.

(51) Int. Cl.
*H01M 50/507* (2021.01)
*H01M 10/04* (2006.01)
*H01M 50/207* (2021.01)

(52) U.S. Cl.
CPC ..... *H01M 50/507* (2021.01); *H01M 10/0404* (2013.01); *H01M 50/207* (2021.01)

(58) Field of Classification Search
CPC ............ H01M 50/507; H01M 50/207; H01M 10/0404
See application file for complete search history.

(56) References Cited

U.S. PATENT DOCUMENTS

2009/0297892 A1 12/2009 Ijaz et al.
2013/0122339 A1 5/2013 Seung
2016/0118633 A1 4/2016 Honggo et al.
2020/0212380 A1* 7/2020 Kwag ................ H01M 50/213
2021/0167467 A1* 6/2021 Yang ................. H01M 50/505

FOREIGN PATENT DOCUMENTS

| EP | 2390945 | 11/2011 | |
| WO | WO-2019022388 A1 * | 1/2019 | .......... H01M 50/507 |
| WO | 2019052425 | 3/2019 | |
| WO | WO-2020060069 A1 * | 3/2020 | .......... H01M 50/503 |

OTHER PUBLICATIONS

Patent Cooperation Treaty International Search Report dated May 18, 2021 issued for the parent application assigned International Application No. PCT/CA2021/050276 with an International Filing Date of Mar. 3, 2021.
Patent Cooperation Treaty Written Opinion of the International Searching Authority dated May 18, 2021 issued for the parent application assigned International Application No. PCT/CA2021/050276 with an International Filing Date of Mar. 3, 2021.

* cited by examiner

*Primary Examiner* — Jimmy Vo
(74) *Attorney, Agent, or Firm* — Damien G. Loveland (57) ABSTRACT

A busbar holder with two busbar trays maintains positive and negative busbars separate and insulated from each other to reduce the chance of accidental short circuits. Cells are located in a frame onto which the busbar holder is mounted. One busbar is located in a bottom tray of the busbar holder. Legs of the busbar project down through holes in the bottom tray, for connection to one set of terminals of the cells. A top tray is placed over the bottom tray. Another busbar, in the top tray, is connected through holes in both trays to the other set of terminals of the cells. The busbar in the bottom tray is covered by the top tray. Holes through the busbar holder allow for hot gases to escape in the event of cell failure.

17 Claims, 8 Drawing Sheets

BUSBAR HOLDER FOR BATTERY

TECHNICAL FIELD

This invention relates to busbars that connect to cells in a battery. More specifically, it relates to a busbar holder that is an assembly of trays and busbars in which the busbars are separated from each other in different layers.

BACKGROUND

The demand for electrically based vehicles and devices has increased these last years due to their relatively low environmental impact compared to prior technologies. The development of safer and more efficient electrical cells and associated technologies is important for the economic expansion of these fields.

Battery packs made up of cylindrical cells are typically connected on the top at the cap (positive terminal) and at the bottom surface (negative terminal). In this type of arrangement, the conductors that are usually welded to these surfaces have a good physical distance.

In a different configuration of battery packs, both electrical connections are made at the top of the cell, one at the cap (positive) and the other at the crimp (negative). This type of configuration requires the typical plastic insulating sleeve to be removed in a region in which the connection to the crimp is to be made. With both connectors in close proximity, it is easy to accidentally create a dangerous short circuit during assembly. It is also a hazard in the case when a battery pack is physically damaged, for instance as a result of a crash.

This background is not intended, nor should be construed, to constitute prior art against the present invention.

SUMMARY OF INVENTION

The present invention is a system for electrically connecting to cells in a cell holder. Disclosed is a series of plastic insulating trays that enforce a physical distance between the busbars. The trays may provide increased clearance and creepage distances to the busbars by incorporating a labyrinth of walls around the busbars. The trays together with the cell frame form a cell holder, which serves to encase the positive electrical surfaces of the battery cells and positive busbar during handling, assembly, or service. This helps to ensure safety and reduces the chance of unintended short circuits of the battery or cells.

The assembly of the cell holder involves slipping the cells into a frame and then positioning a bottom tray with positive busbar onto the frame. The busbar is then connected to the cells. A top tray with a negative busbar is then positioned on the bottom tray and connected to the cells.

Disclosed herein is a busbar holder comprising: a bottom tray defining a first plurality of holes and a second plurality of holes; a first busbar on the bottom tray, the first busbar having legs that each pass through a different one of the first plurality of holes; a top tray defining a third plurality of holes, the top tray mounted above the bottom tray so that the third plurality of holes align with the second plurality of holes; and a second busbar on the top tray, the second busbar having legs that each pass through a different one of the third plurality of holes and a different one of the second plurality of holes.

Also disclosed is a method for assembling a cell holder comprising: placing a cell in each compartment of frame that comprises a plurality of compartments; placing a bottom tray over the frame, the bottom tray defining a first plurality of holes and a second plurality of holes and comprising a plurality of caps extending from a lower surface thereof, each cap dimensioned to fit around an upper portion of one of the cells, wherein each cap encompasses one of the first plurality of holes and one of the second plurality of holes; connecting a first busbar to a first polarity terminal on each of the cells, the first busbar present on the bottom tray and having legs that each pass through a different one of the first plurality of holes; placing a top tray over the bottom tray, the top tray defining a third plurality of holes that align with the second plurality of holes; and connecting a second busbar to a second polarity terminal on each of the cells, the second busbar present on the top tray and having legs that each pass through a different one of the third plurality of holes and a different one of the second plurality of holes.

Further disclosed is a busbar holder kit comprising: a bottom tray defining a first plurality of holes and a second plurality of holes; a first busbar dimensioned to fit on the bottom tray, the first busbar having legs each of which are dimensioned to pass through a different one of the first plurality of holes; a top tray defining a third plurality of holes, the top tray dimensioned to mount above the bottom tray so that the third plurality of holes align with the second plurality of holes; and a second busbar dimensioned to fit on the top tray, the second busbar having legs each of which are dimensioned to pass through a different one of the third plurality of holes and a different one of the second plurality of holes.

Still further disclosed is a busbar holder comprising: a bottom tray defining a first plurality of holes; a first busbar on the bottom tray, the first busbar having a second plurality of holes that align with the first plurality of holes, and having legs that each pass through a different one of the first plurality of holes; a top tray defining a third plurality of holes, the top tray mounted above the first busbar so that the third plurality of holes align with the second plurality of holes; and a second busbar on the top tray, the second busbar having a fourth plurality of holes that align with the third plurality of holes, and having legs that each pass through a different aligned set of one of the third plurality of holes, one of the second plurality of holes and one of the first plurality of holes.

BRIEF DESCRIPTION OF THE DRAWINGS

The following drawings illustrate embodiments of the invention, which should not be construed as restricting the scope of the invention in any way.

DESCRIPTION

A. Glossary

Cell or electrical cell—this refers to a device capable of generating electricity from a chemical reaction. A cell typically has one positive terminal and one negative terminal. Cells may be rechargeable.

Clearance distance—this refers to the shortest distance through air between two conductors, such as the positive and negative terminals of a cell. It may be a line of sight between the two conductors or it may include multiple straight segments if there is an insulating obstruction in the direct path between the conductors.

Creepage distance—this refers to the shortest distance across the surface of an insulator between two conductors, such as the positive and negative terminals of a cell.

Busbar—this refers to a metallic strip, spider, plate or other structure, which is used as an electrical conductor for multiple components. Usually, a busbar is a single piece of metal.

Collector—a form of busbar that connects to terminals of one or more cells.

Snap lock—this refers to a device or a feature on a device that is capable of fastening two or more components together. One component is fastened to another component by one portion of the snap lock being set in position relative to the other portion of the snap lock, either by sliding, rotating or any other suitable movement. Snap locks may be permanent or temporary, or irreversible or reversible.

B. Exemplary Embodiments

Figure 1:
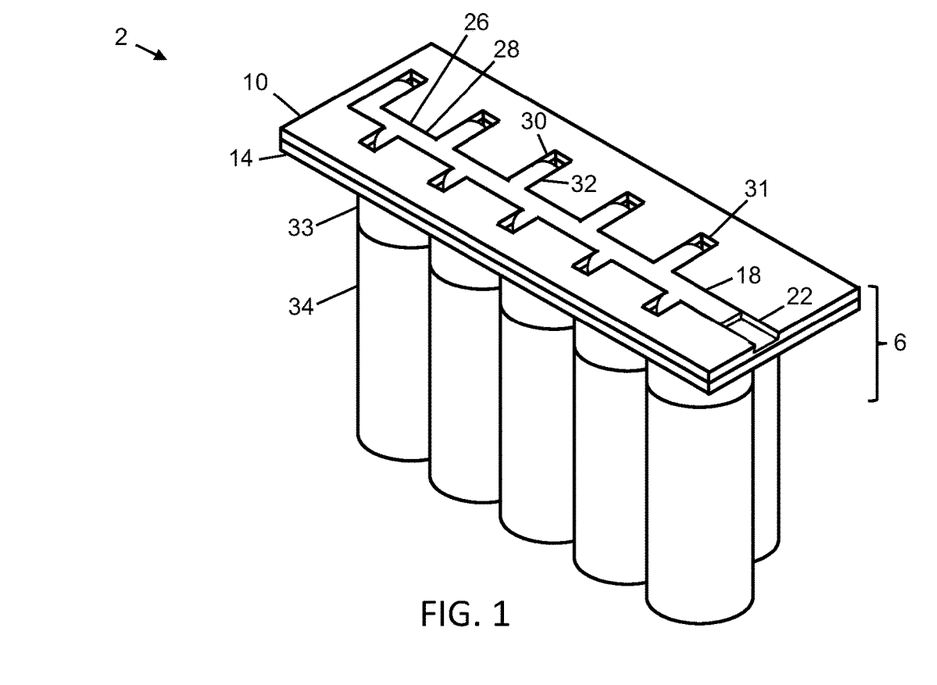
FIG. 1 is a schematic drawing representing a perspective view of a cell holder, according to an embodiment of the preset invention.

Referring to FIG. 1, there is shown a cell holder 2 with a busbar holder 6. The busbar holder 6 has one top tray 10 and one bottom tray 14 underneath the top tray. The top tray 10 holds a negative busbar 18. The bottom tray 14 holds a positive busbar, which is not visible. The negative busbar 18 is located in a slot 22 in the upper surface of the top tray 10. The slot 22 has the same general geometry as the negative busbar 18. The negative busbar 18 may slip loosely into the slot 22, it may be a snug fit in the slot or it may be a clip fit into the slot. The same applies to the positive busbar in the bottom tray 14.

The central channel 26 of the slot 22 hosts the elongated central body or trunk 28 of the negative busbar 18. The lateral channels 30 of the slot 22 host the branches 32 of the negative busbar 18. The branches 32 of the negative busbar 18 extend to legs that pass though holes 31 in the top tray 10 and corresponding holes in the bottom tray 14, via which they are connected to the cells. The top tray 10 is mounted on the bottom tray 14 in such a way that the lower surface of the top tray is in contact with the upper surface of the bottom tray. As a result, the lower surface of the top tray 10 helps to enclose the positive busbar, which is placed on the bottom tray 14.

The bottom tray 14 has integral caps 33 projecting down from its lower surface. These caps 33 each cover a top portion of a cell held in the frame 34.

In some embodiments, a sealing material, adhesive or coating is placed between the trays 10 and 14 and between the caps 33 of the bottom tray 14 and the frame 34. In some embodiments, a paper-like flame barrier material such as Nomex® is incorporated into the cell holder 2 at positions where hot gas from the cells may come in contact with the plastic from which the cell holder is made.

The lower portion of the bottom tray 14 is fastened to the cell frame 34 of the cell holder, for example by the top tray 10 snap-locking to the cell frame through holes in the bottom tray. Other connection techniques are also possible. The lower portion of the bottom tray 14 has a shape that is conformal with the shape of the cell frame 34 of the cell holder. In some embodiments, the shape of the lower portion of the bottom tray 14 is different than the shape of the cell frame 34 of the cell holder. In some embodiments, the width and breadth of the bottom tray 14 is larger than the width and breadth of the cell frame 34 of the cell holder. Likewise, the shape and size of the top tray 10 may be different to the shape and size of the bottom tray 14.

In some embodiments, for manufacturing purposes, the geometry of the cell frame 34 and the trays 10 and 14 may be different. For example, the walls of cell frame 34 may be slightly inclined to facilitate a molding process. Other lead-ins and molding drafts may also be incorporated.

Figure 2:
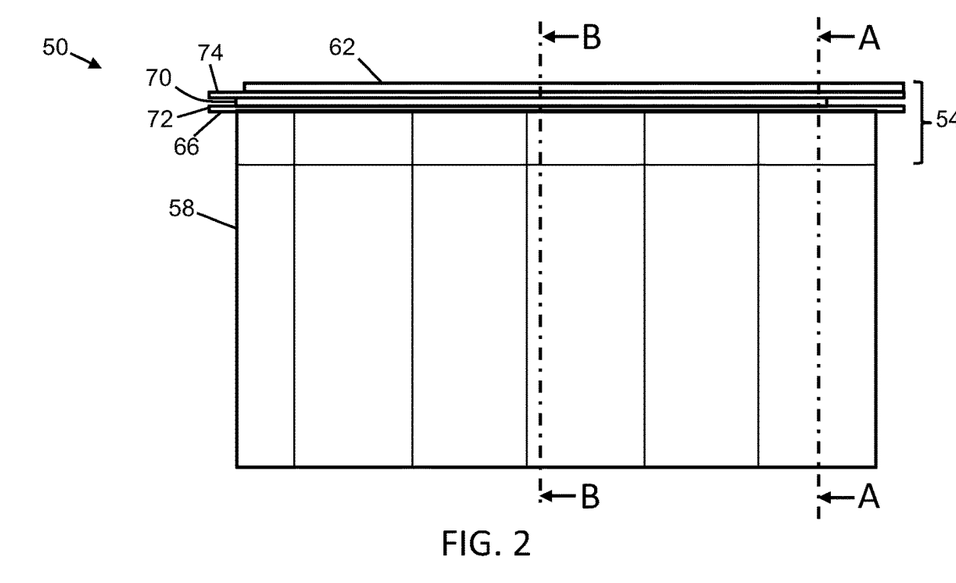
FIG. 2 is a schematic drawing representing the holder as seen from the side, according to an embodiment of the present invention.

Referring to FIG. 2, there is shown an exemplary cell holder 50 with the busbar holder 54 mounted on the cell frame 58. The busbar holder 54 has a top tray 62 mounted on a bottom tray 66. The top portion 70 of the bottom tray 66 is a wall that substantially surrounds the positive busbar, which rests on top of the lower portion 72 of the bottom tray. The top portion 70 of the bottom tray is also smaller in extent than the lower portion 74 of the top tray. This difference in size forms a gap. This gap may provide a route for a connection to be made to the positive busbar, while keeping the positive conductor electrically insulated from the negative busbar.

Figure 3:
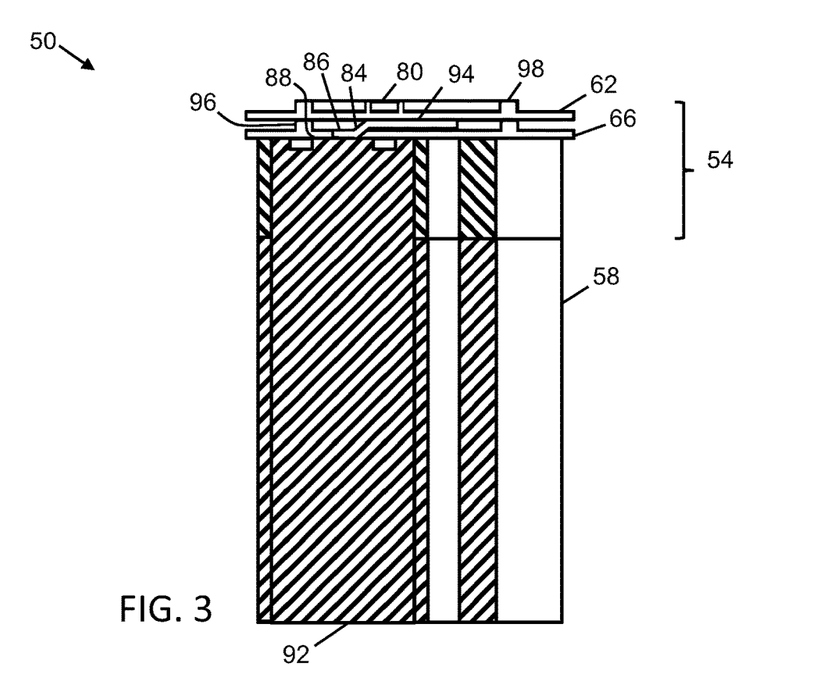
FIG. 3 is a schematic drawing representing a sectional view (section A-A of FIG. 2) of the cell holder as seen from the side, according to an embodiment of the present invention.

Referring to FIG. 3, which is section A-A of FIG. 2, there is shown the cell holder 50 with the busbar holder 54 mounted on the cell frame 58. The negative busbar 80 is in the top tray 62. The top tray 62 of the busbar holder 54 is mounted on the bottom tray 66 of the busbar holder 54. The bottom tray 66 hosts a positive busbar 84. The positive busbar 84 has bottom portions or feet 86, which are exposed through the lower surface of the bottom tray 66, via holes in the bottom tray. The foot 86 of the positive busbar is in contact, for example welded, with the positive terminal 88 (cap) located at the top of the battery cell 92 in the cell holder 50. The upper portion 94 (i.e. trunk and branches) of the positive busbar 84 is in contact with the lower surface of the top tray 62, although this contact is not necessary.

A wall 96 projects upwards from the upper surface of the bottom tray 66. This wall 96 supports the top tray 62. In other embodiments (e.g. FIG. 1), there is no wall 96 and the upper surface of the bottom tray 66 supports the top tray 62, with the positive busbar 84 lying below the top surface of the bottom tray. A wall 98 projects upwards from the upper surface of the top tray 62. This wall 98 may be used to support or seal with an electrically insulating cover over the top of the busbar holder 54.

The system may provide for a small assembly stroke distance. The cells 92 do not need to be pressed into place in cell frame 58, which reduces the chances of damaging a cell during the assembly of the cell holder 50. Depending on the embodiment, different techniques may be used to retain the cells 92 in the bottom of the cell holder 50. The retainers for this may be integral with the cell frame 58 or they may be additional components that are fixed to the cell frame. The cell holder 50 may provide sufficient mechanical restraint of the cells 92 without the use of traditional screws or connectors, which may otherwise become loose, creating the risk of electrical shock or fire. The trays 62, 66 may be snapped together to the frame in a pressing operation, securing the cells in place with snap locks. In other embodiments the trays 62, 66 and frame may be fixed together using screws or other fasteners.

Figure 4:
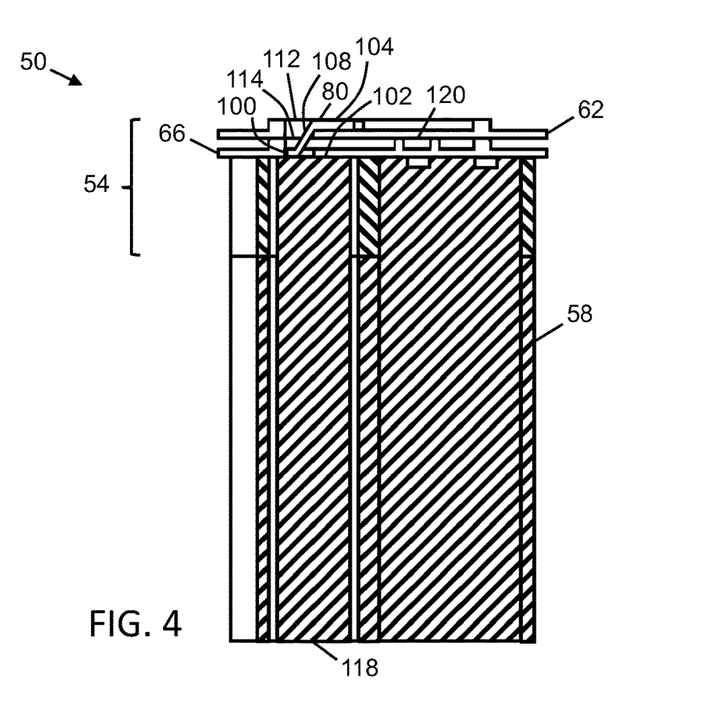
FIG. 4 is a schematic drawing representing a sectional view (section B-B of FIG. 2) of the cell holder as seen from the side, according to an embodiment of the present invention.

Referring to FIG. 4, which is section B-B of FIG. 2, there is shown the busbar holder 54 with the negative busbar 80 visible. The negative busbar 80 has a lower portion or foot 100 which is in contact with the battery cell terminal or crimp 102. The upper portion 104 (i.e. trunk and branches) of the negative busbar 80 is embedded below the uppermost surface of the top tray 62. The foot 100 and leg 108 of the negative busbar are inserted through a hole 112 in the top tray 62 and a correspondingly aligned hole 114 in the bottom tray 66. The hole 112 is large enough to allow the foot 100 of the negative busbar 80 to be spot welded to the negative terminal or crimp 102 of the cell 118. The top surface of the cell 118 is exposed through holes 112, 114, which allow how gases that are emitted from a failing cell to escape through them.

The upper portion 120 of the positive busbar is embedded in the top surface of the bottom tray 66. The upper portion 120 of the positive busbar 84 is in contact with the lower surface of the top tray 62, although this contact is unnecessary.

Locating elements in the trays 62 and 66 and frame 58 may aid in assembly of the cell holder 50 by aligning the trays and hence the busbars 80, 84 in the correct positions relative to the frame prior to welding.

In some embodiments, the cell frame 58, the bottom tray 62 and the top tray 66 are made of a plastic material, such as a polycarbonate/acrylonitrile-butadiene-styrene (PC/ABS) blend polymer or a fiber reinforced polycarbonate. Different plastics may be used for each of the cell frame 58, the bottom tray 66 and the top tray 62. The trays 62 and 66 are made of a flexible material that provides electrical insulation between the busbars 80 and 84. In other embodiments, the material may be rigid. In some embodiments, the negative busbar 80 is bonded ultrasonically to the cell terminals 102, as is the positive busbar 84 to the caps 88.

Figure 5:
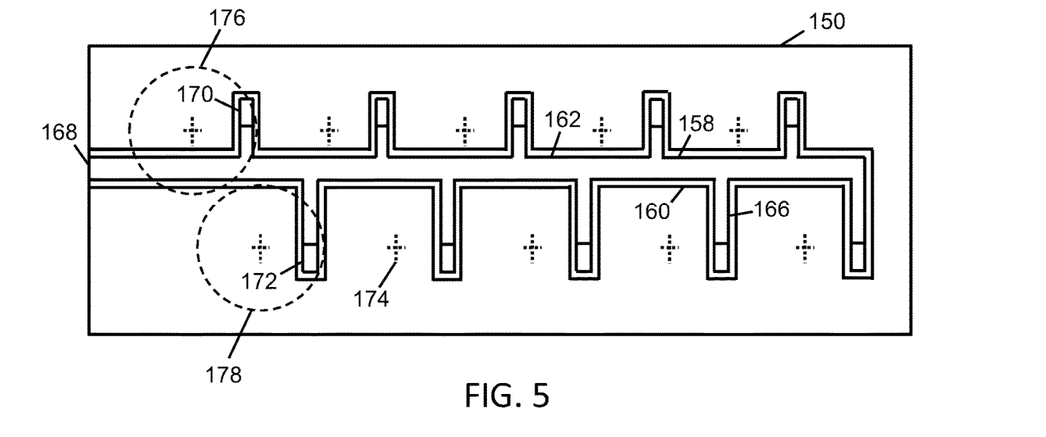
FIG. 5 is a schematic drawing representing a top tray of the cell holder as seen from above, according to an embodiment of the present invention.
Figure 7:
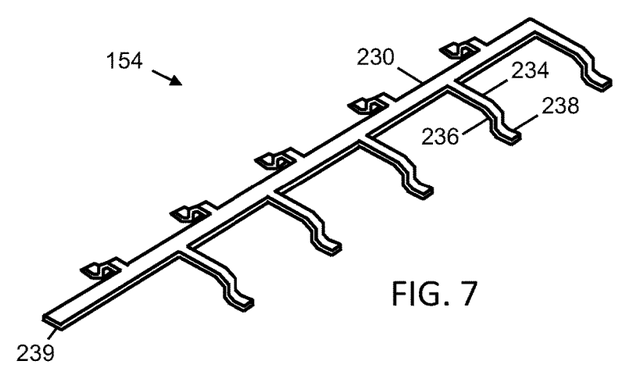
FIG. 7 is a perspective view of a negative busbar, according to an embodiment of the present invention.

Referring to FIG. 5, there is shown the top tray 150 of an exemplary busbar holder, for holding a negative busbar (154, FIG. 7). The negative busbar can be embedded in a slot 158 on the top surface of the top tray 150, the slot being formed by walls 160 projecting upwards from the top surface of the top tray. The slot 158 has an elongated central channel 162 that extends along most of the length of the top tray 150, and multiple lateral channels 166 that extend sideways from the central channel. The central channel 162 of the slot 158 hosts the trunk of the negative busbar.

Holes 170, 172 in the ends of the lateral channels 166 of the slot 158 allow the legs of the negative busbar to pass through the top plate 150 in order to be connected to the crimps of the cells 176, 178. Only two of the cells are shown, for clarity. The holes 170, 172 align with the crimps at the edges of the cells 176, 178. For reference, the crosses 174 mark the centers of the cells. The end 168 of the central channel 162 may provide for extension of the negative busbar or connection thereto, for electrical connection to an electrical load and/or charger.

Figure 6:
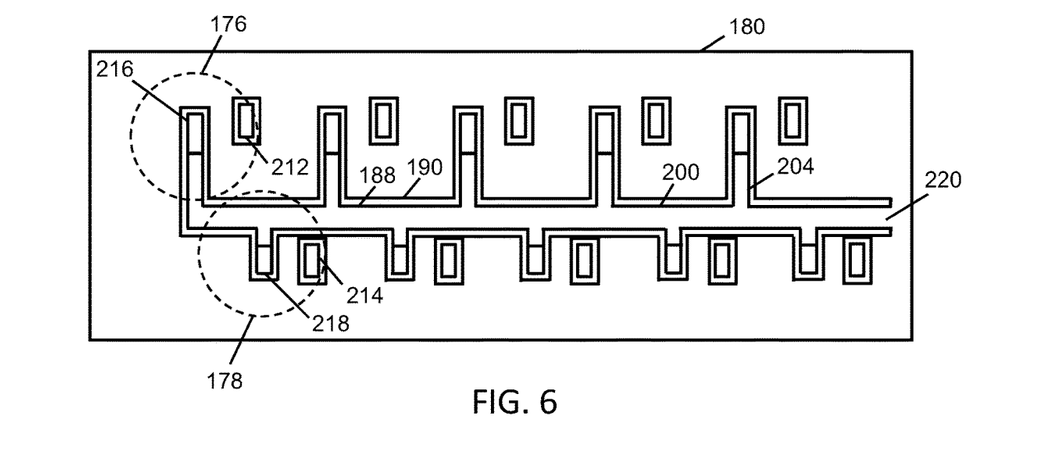
FIG. 6 is a schematic drawing representing a bottom tray of the cell holder as seen from above, according to an embodiment of the present invention.
Figure 8:
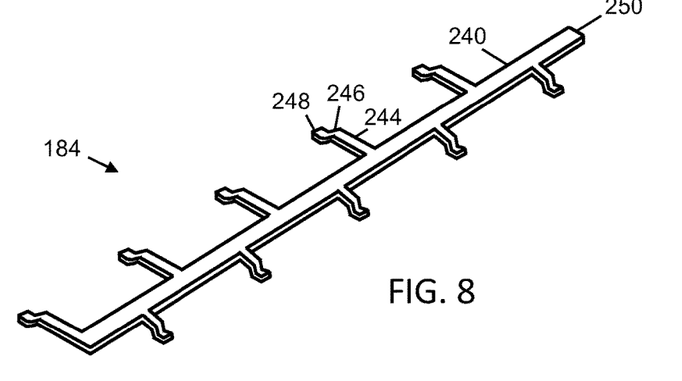
FIG. 8 is a perspective view of a positive busbar, according to an embodiment of the present invention.

Referring to FIG. 6, there is shown the bottom tray 180 of an exemplary busbar holder, for holding a positive busbar (184, FIG. 8). The positive busbar can be embedded in a slot 188 on the top surface of the bottom tray 180, the slot being formed by walls 190 projecting upwards from the top surface of the top tray. The slot 188 has a long central channel 200 that extends along most of the length of the bottom tray 180, and multiple lateral channels 204 that extend sideways from the central channel 200. The central channel 200 of the slot hosts the trunk of the positive busbar. The lateral channels 204 of the slot 188 host the branches of the positive busbar.

Holes 212, 214 are present in the bottom tray 180 in order to allow the legs of the negative busbar to pass through, from the top tray 150 to the cells 176, 178. The feet of the negative busbar can therefore reach the crimp terminals of the cells located under the bottom tray 180. Holes 212, 214 are aligned with holes 170, 172 in the top tray 150 when the top tray and bottom tray 180 are aligned with each other. Holes 216, 218 in the ends of the lateral channels 204 of the slot 188 allow the legs of the positive busbar to pass through the bottom plate 180 in order for the feet to be connected to the caps of the cells 176, 178. The holes 216, 218 align with the caps at the centers of the cells 176, 178. The end 220 of the central channel 200 may provide for extension of the positive busbar or connection thereto, for electrical connection to an electrical load and/or charger.

Each cap 33, projecting below from a lower surface of the bottom tray 180, is dimensioned to fit round an upper portion of each cell 176, 178. Each cap 33 therefore encompasses one central hole (e.g. 216 or 218) for the positive terminal and one hole (e.g. 212 or 214) for the negative terminal.

Referring to FIG. 7, there is shown a negative busbar 154, which may be held in the top tray (150, FIG. 5). The negative busbar 154 has an elongated central body or trunk 230 that extends laterally at multiple locations to form branches 234. The branches 234 are flat and level with the trunk 230. The trunk 230 and the branches 234 on both sides of the trunk 230 are in a common plane. The branches 234 extend to a downward portion or leg 236. The leg 236 levels out at the bottom to a lower portion or foot 238. The branches 234, legs 236 or both may be made of material with some springiness. The bottom surfaces of the feet 238 are connected, e.g. by welding, to the crimps of the cells. The negative busbar 154 may be connected to an external load or charger via its end 239 or via any area on the upper surface of the trunk 230.

Referring to FIG. 8, there is shown a positive busbar 184, which may be held in the bottom tray (180, FIG. 6). The positive busbar 184 has a long central body or trunk 240 that extends laterally at multiple locations to form branches 244. The branches 244 are flat and level with the trunk 240. Branches 244 on both sides of the trunk 240 and the trunk are in a common plane. The branches 244 extend to a downward portion or leg 246. The leg 246 levels out at the bottom to the lower portion or foot 248. The branches 244, legs 246 or both may be made of material with some springiness. The bottom surfaces of the feet 248 are connected, e.g. by welding, to the caps of the cells. The positive busbar 184 may be connected to an external load or charger via its end 250.

Figure 9:
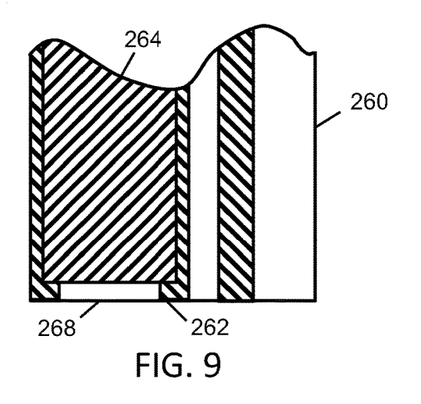
FIG. 9 is a schematic drawing representing a sectional view of the bottom portion of a cell holder as seen from the side, according to another embodiment of the present invention.

Referring to FIG. 9, there is shown a bottom portion of an exemplary cell frame 260. The ledge 262 supports the cell 264. In some embodiments, the ledge 262 forms a well 268 that is filled with epoxy resin material. The epoxy resin material glues the bottom of the cell 264 to a cold plate positioned underneath the cell frame 260. In some embodiments there may be a mechanical connection, using screws for example, of the cell frame 260 to the cold plate to ensure that there is an even pressure on the cold plate and so that it remains flat. The cold plate may be referred to as a cooled plate, with cooling provided by circulating coolant fluid or by air cooling during operation. The use of screws here allows for the completion of the assembly of the cell frame 260 before the glue cures. Such completion may involve, for example, the welding of the negative busbar to the cells.

Figure 10:
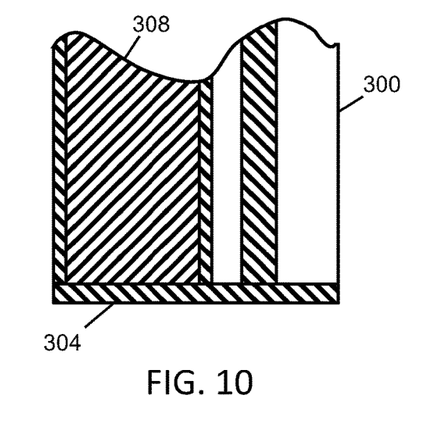
FIG. 10 is a schematic drawing representing a sectional view of the bottom portion of a cell holder as seen from the side, according to another embodiment of the present invention.

Referring to FIG. 10, there is shown another embodiment of a bottom portion of the cell frame 300. The cell frame 300 is placed on a cooling plate 304 in such a manner that the bottom part of the cell 308 in the cell frame is in contact with the cooling plate. Adhesive may be used to join the cooling plate 304 to the cell frame 300 and/or the cells 308. Optionally, thermally conductive grease may be applied between the cooling plate 304 and the cells 308.

The busbar holder may be provided in a kit of parts. For example, the kit of parts may include the top tray 150 (FIG. 5), the bottom tray 180 (FIG. 6), the negative busbar 154 (FIG. 7) and the positive busbar 184 (FIG. 8). Also included in the kit may be the cell frame 34 (FIG. 1).

C. Process

Figure 11:
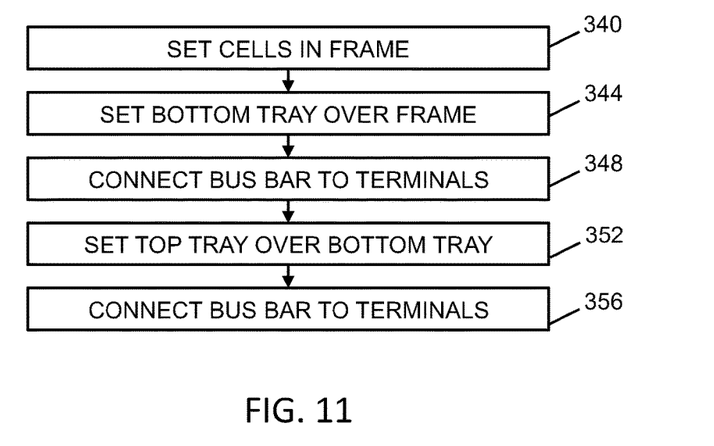
FIG. 11 is a flowchart describing the steps of the assembly process of the cell holder according to an embodiment of the present invention.

Referring to FIG. 11, steps are shown to assemble the cell holder. In step 340, the cells are placed in the cell frame. Then in step 344, the bottom tray is set over the cell frame with the cells already in place. The bottom tray may already hold the positive busbar, or the positive busbar may be added to the bottom tray when it is over the cell frame. After that, the positive busbar is connected to the terminals in step 348, for example by spot welding or ultrasonic welding. The top tray is then set over the bottom tray in step 352. The top tray may already hold the negative busbar, or the negative busbar may be added to the top tray when it is over the bottom tray. In setting the top tray over the bottom tray, it may be fastened through holes in the bottom tray to the cell frame with snap-lock connectors, for example, holding the bottom tray in place. After this, the negative busbar is spot welded to the negative terminals in step 356. Optionally, a cold plate is then glued to the bottoms of the cells in the cell holder, or this may be done as part of step 340.

D. Series-Parallel Configuration

Figure 12:
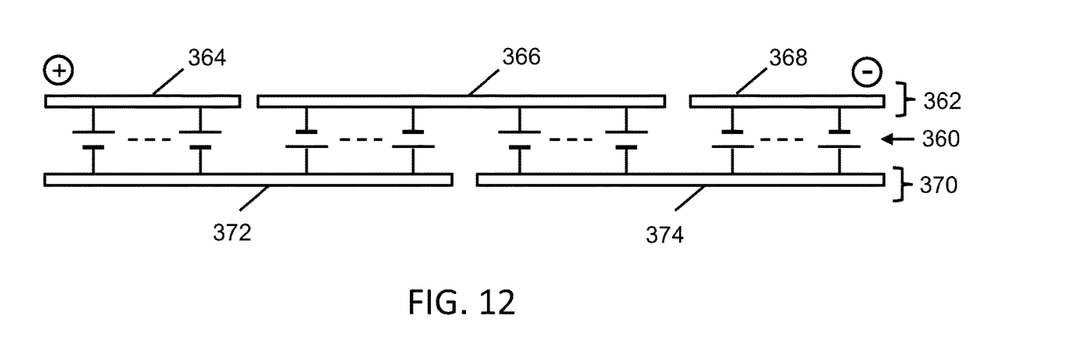
FIG. 12 is a schematic circuit diagram of a series-parallel configuration, according to an embodiment of the present invention.

Referring to FIG. 12, the cells 360 in the battery may be connected in an arrangement of series and parallel. For example, the upper layer 362 of busbars may be divided into separate collectors 364, 366, 368 of the battery, and the lower layer 370 of busbars may be divided into collectors 372, 374. The cells 360 are of course physically located below the lower layer 370 of busbars. Collector 364 forms a positive terminal and collector 368 forms a negative terminal. There may be nine cells, for example, connected in each parallel group. Other numbers are possible in other embodiments.

Figure 13:
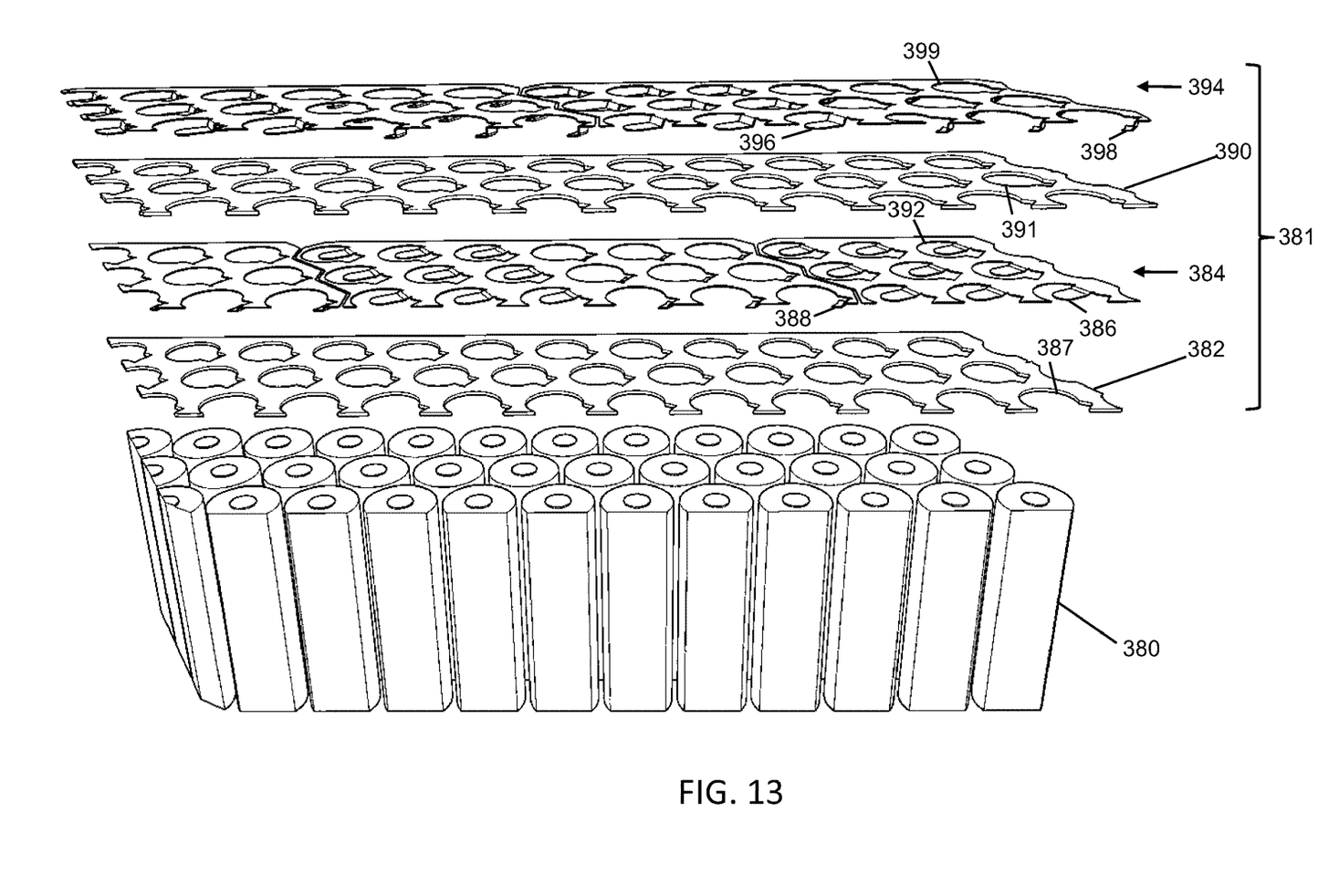
FIG. 13 is an exploded view of a busbar holder for a series-parallel configuration, according to an embodiment of the present invention.

FIG. 13 shows an exemplary battery pack with cells 380 and busbar holder 381. The bottom tray 382 of the busbar holder may be made form an insulator such as G4. Above the bottom tray 382 there is a busbar layer of three collectors 384, which are electrically isolated from each other. The collectors 384 in the lower layer of busbars may connect to only positive terminals of some of the cells 380, only negative terminals of some of the cells, or positive terminals of some of the cells and negative terminals of others of the cells. The collectors 384 include positive tabs 386 for connecting to the positive terminals of some of the cells 380. The positive tabs 386 physically step down so that they can pass through the holes 387 in the bottom busbar tray 382, in order to reach the cells 380. The collectors 384 include negative tabs 388 for connecting to the negative terminals of some of the cells 380. The negative tabs 388 physically step down so that they can pass through the holes 387 in the bottom busbar tray 382, in order to reach the cells 380.

A top tray 390, for example made from G4 insulator, is placed above the lower busbar layer 384. The holes 391 in the top tray 390 generally align with the holes 392 in the collectors 384 of the lower busbar layer, and the holes 387 in the bottom tray 380.

Above the top tray 390 there is a busbar layer of two collectors 394, which are electrically isolated from each other. The collectors 394 in the top layer of busbars may connect to only positive terminals of some of the cells 380, only negative terminals of some of the cells, or positive terminals of some of the cells and negative terminals of others of the cells. The collectors 394 include positive tabs 396 for connecting to the positive terminals of some of the cells 380. The positive tabs 386 physically step down so that they can pass through the holes 391 in the top tray 390, the holes 392 in the bottom busbar layer of collectors 384, and holes 387 in the bottom busbar tray 382, in order to reach the cells 380. The positive tabs 396 physically step down further than the positive tabs 386. The collectors 394 include negative tabs 398 for connecting to the negative terminals of some of the cells 380. The negative tabs 398 physically step down so that they can pass through the holes 391 in the top tray 390, the holes 392 in the bottom busbar layer 384, and holes 387 in the bottom busbar tray 382, in order to reach the cells 380. The negative tabs 398 step down further than the negative tabs 388.

The aligned holes 387, 392, 391, which are also aligned with holes 399 in the top busbar layer 394, are also aligned with the tops of the cells 380. This alignment, which may be complete or partial, allows for hot gases that may escape from the tops of failing cells, if any, to be directed away from the cells through the holes, 387, 392, 391, 399.

Figure 14:
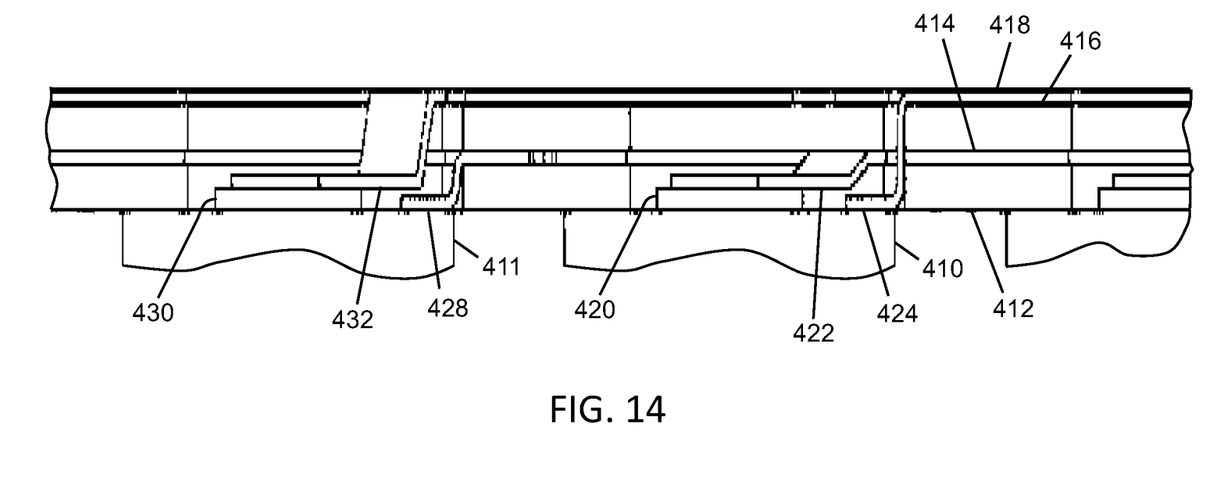
FIG. 14 is a cross-sectional view of a busbar holder enlarged in the vertical direction, according to an embodiment of the present invention.

FIG. 14 shows in more detail how the connections are made from the collectors to the cells. For the purposes of illustration, the drawing is enlarged more in the vertical direction than the horizontal direction. Above cells 410, 411 there is shown, in order, a bottom tray 412, a bottom busbar layer 414, a top tray 416 and a top busbar layer 418. A collector of the bottom busbar layer 414 is shown connected to the positive terminal 420 of cell 410 via the tab 422. A collector of the top busbar layer 418 is connected to the negative terminal of the cell 410 via the tab 424.

Further along the busbar holder, a collector of the bottom busbar layer 414 is shown connected to the negative terminal of the cell 411 via the tab 428. A collector of the top busbar layer 418 is connected to the positive terminal 430 of cell 411 via the tab 432.

Figure 15:
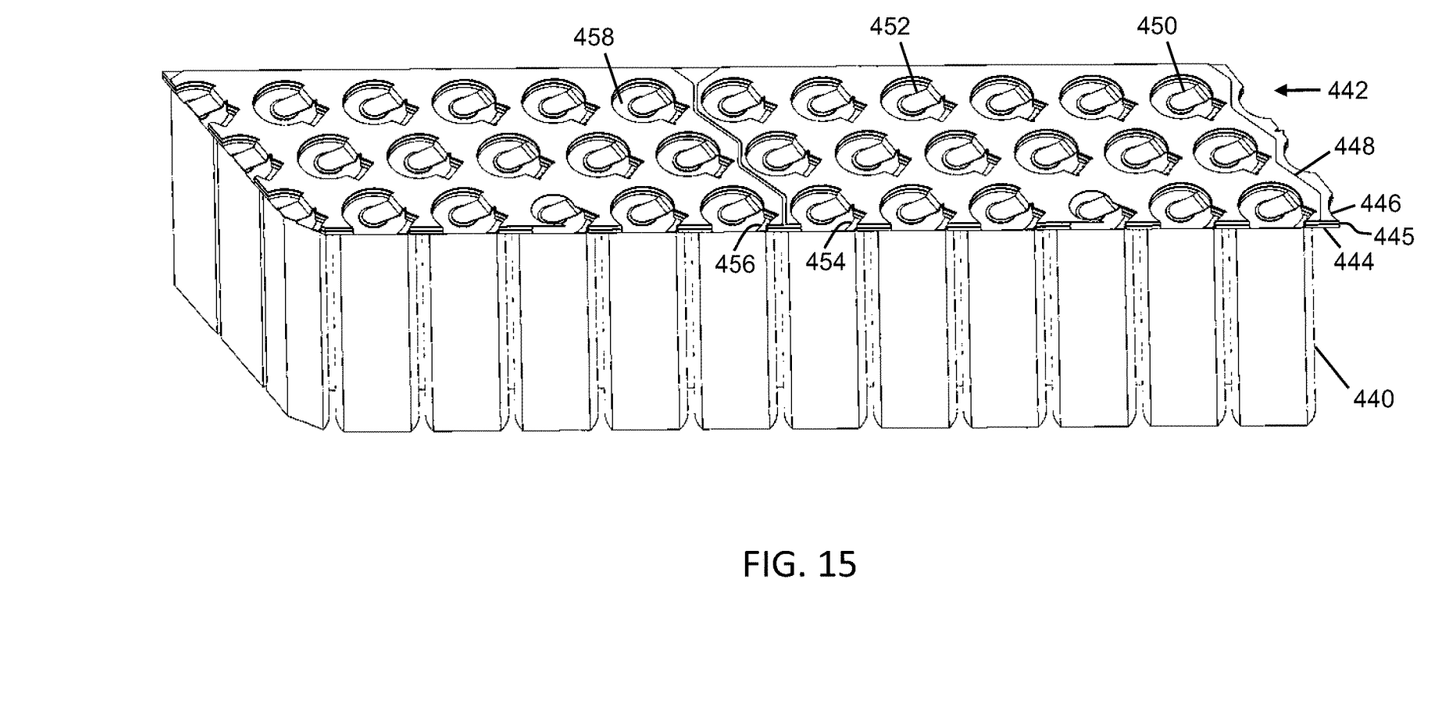
FIG. 15 is a cut-away perspective view of a battery of cells with a busbar holder, according to an embodiment of the present invention.
Figure 16:
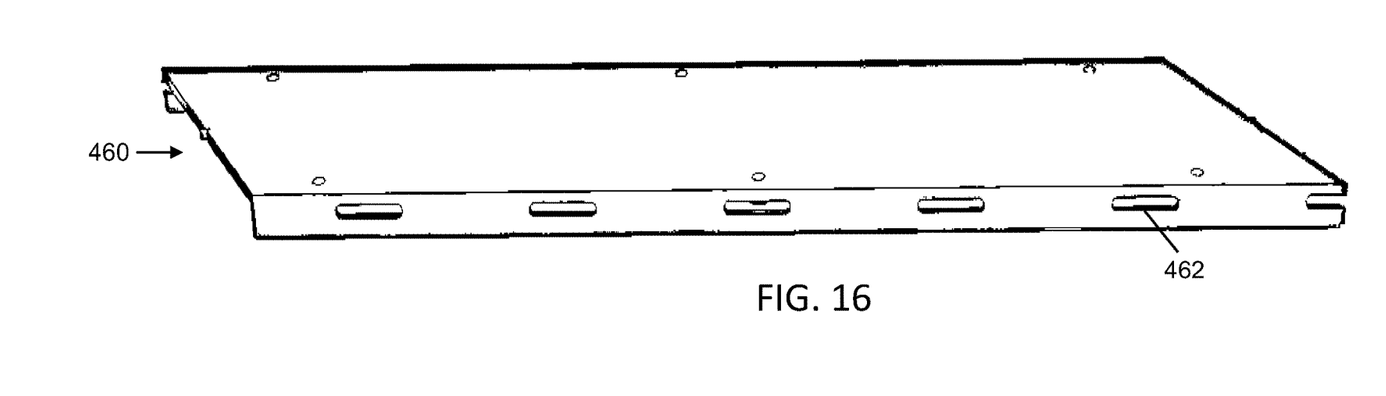
FIG. 16 is a perspective view of a venting cover that is placed over a battery with the busbar holder, according to an embodiment of the present invention.

FIG. 15 shows a cutaway view of a cell frame 440 holding cells that are connected to busbars in a busbar holder 442. The busbar holder 442 includes a bottom tray 444 and a top tray 446, between which there is a layer of bottom collectors 445 or busbars. The top layer 448 of collectors is more clearly visible. Positive tabs 450 from the bottom collectors 445 connect to the positive terminals of some of the cells. Positive tabs 452 from the top collectors 448 connect to the positive terminals of others of the cells. Negative tabs 454 from the bottom collectors 445 connect to the negative terminals of some of the cells. Negative tabs 456 of the top collectors 448 connect to the negative terminals of others of the cells. The top surfaces of the cells 458 are exposed through the holes defined in the various layers of the busbar holder 442. FIG. 16 shows a plastic cover that may be attached over the battery pack of FIG. 15. It may be attached so that there is a gap between the top surface of the top collectors 448 and the underside of the cover, so that a path 460 is provided for the exhausting of hot gases from the cells in the event that they fail. Venting holes 462 may also be present in the sides of the cover. The cover may be thermoplastic, for example, so that it can be touched safely while handling.

E. Variations

Busbars, and the collectors that form the busbars, may be made of copper or aluminum, for example. Busbars may be connected to the polarities opposite to those described above. Components that are integral may be made from discrete components fixed together. In some embodiments, the physical proportions of the components may be different to those shown in the embodiments described herein. Embodiments without the caps 33, or without the caps being integral with the bottom tray, are also possible. Other fixing techniques may be employed to connect the top tray to the bottom tray and the cell frame.

In general, unless otherwise indicated, singular elements may be in the plural and vice versa with no loss of generality.

Depending on the embodiment, one or more, but not necessarily all of the advantages described herein may be provided.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. All parameters, dimensions, materials, and configurations described herein are examples only and may be changed depending on the specific embodiment. Accordingly, the scope of the invention is to be construed in accordance with the substance defined by the following claims.

The invention claimed is:

1. A busbar holder comprising:
a bottom tray defining a first plurality of first holes and a second plurality of second holes, each first hole separated from each second hole;
a first busbar on the bottom tray, the first busbar having legs that each pass through a different one of the first holes for connection to a first polarity terminal of a different one of a plurality of cells;
a top tray defining a third plurality of third holes, the top tray mounted above the bottom tray so that the third plurality of third holes align with the second plurality of second holes; and
a second busbar on the top tray, the second busbar having legs that each pass through a different one of the third holes and a different one of the second holes for connection to a second polarity terminal of a different one of the plurality of cells.

2. The busbar holder of claim 1 wherein:
the legs of the first busbar have first feet for the connection to said first polarity terminals; and
the legs of the second busbar have second feet for the connection to said second polarity terminals.

3. The busbar holder of claim 1, wherein:
the bottom tray has an elongated slot that extends laterally in multiple locations to form lateral channels; and
the first busbar has an elongated central body and branches that are located in the elongated slot and the lateral channels respectively.

4. The busbar holder of claim 3 comprising a wall adjacent to the elongated slot and the lateral channels.

5. The busbar holder of claim 1, wherein:
the top tray has an elongated slot that extends laterally in multiple locations to form lateral channels; and
the second busbar has an elongated central body and branches that are located in the elongated slot and the lateral channels respectively.

6. The busbar holder of claim 5 comprising a wall adjacent to the elongated slot and the lateral channels.

7. The busbar holder of claim 1, wherein:
the first busbar comprises a first elongated central body and first branches extending therefrom in a first common plane, each first branch terminating in a different one of said legs of the first busbar; and
the second busbar comprises a second elongated central body and second branches extending therefrom in a second common plane, each second branch terminating in a different one of said legs of the second busbar.

8. The busbar holder of claim 7, wherein the bottom tray and the top tray enclose the first elongated central body and the first branches of the first busbar.

9. The busbar holder of claim 1, wherein:
the bottom tray comprises a plurality of caps extending from a lower surface thereof, each cap dimensioned to fit around an upper portion of a different one of the cells; and
each cap encompasses one of the first holes and one of the second holes.

10. The busbar holder of claim 9 in combination with a frame, wherein:
the frame comprises a plurality of compartments, each for one of said cells; and
each compartment aligns with one of said caps.

11. The busbar holder of claim 1 wherein when the first and second busbars are connected to the cells, a surface of each of the cells is exposed through a different aligned pair of one of the third holes and one of the second holes.

12. A busbar holder kit comprising:
a bottom tray defining a first plurality of first holes and a second plurality of second holes, each first hole separated from each second hole;
a first busbar dimensioned to fit on the bottom tray, the first busbar having legs each of which are dimensioned to pass through a different one of the first holes for connection to a first polarity terminal of a different one of a plurality of cells;
a top tray defining a third plurality of third holes, the top tray dimensioned to mount above the bottom tray so that the third plurality of third holes align with the second plurality of second holes; and
a second busbar dimensioned to fit on the top tray, the second busbar having legs each of which are dimensioned to pass through a different one of the third holes and a different one of the second holes for connection to a second polarity terminal of a different one of the plurality of cells.

13. The busbar holder kit of claim 12 wherein:
the legs of the first busbar have first feet for the connection to said first polarity terminals; and
the legs of the second busbar have second feet for the connection to said second polarity terminals.

14. The busbar holder kit of claim 12, wherein:
the bottom tray has a first elongated slot that extends laterally in multiple locations to form first lateral channels;
the first busbar has a first elongated central body and first branches that are located in the first elongated slot and the first lateral channels respectively;
the top tray has a second elongated slot that extends laterally in multiple locations to form second lateral channels; and
the second busbar has a second elongated central body and second branches that are located in the second elongated slot and second lateral channels respectively.

15. The busbar holder kit of claim 14 wherein:
the bottom tray comprises a first wall adjacent to the first elongated slot and the first lateral channels; and
the top tray comprises a second wall adjacent to the second elongated slot and the second lateral channels.

16. The busbar holder kit of claim 12, wherein:
the first busbar comprises a first elongated central body and first branches extending therefrom in a first common plane, each first branch terminating in a different leg of the first busbar; and
the second busbar comprises a second elongated central body and second branches extending therefrom in a second common plane, each second branch terminating in a different leg of the second busbar.

17. The busbar holder kit of claim 12 further comprising a frame, wherein
the frame comprises a plurality of compartments, each for one of the cells;
the bottom tray comprises a plurality of caps extending from a lower surface thereof, each cap dimensioned to fit around an upper portion of one of the cells;
each cap encompasses one of the first holes and one of the second holes; and
each compartment aligns with a cap.

* * * * *